(12) United States Patent
Kim et al.

(10) Patent No.: US 11,251,684 B2
(45) Date of Patent: Feb. 15, 2022

(54) SENSING MAGNET ASSEMBLY, ROTOR POSITION SENSING APPARATUS, AND MOTOR INCLUDING SAME

(71) Applicant: LG INNOTEK CO., LTD., Seoul (KR)

(72) Inventors: Yong Joo Kim, Seoul (KR); Se Jong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 236 days.

(21) Appl. No.: 16/477,350

(22) PCT Filed: Jan. 11, 2018

(86) PCT No.: PCT/KR2018/000546
§ 371 (c)(1),
(2) Date: Jul. 11, 2019

(87) PCT Pub. No.: WO2018/135805
PCT Pub. Date: Jul. 26, 2018

(65) Prior Publication Data
US 2019/0379261 A1    Dec. 12, 2019

(30) Foreign Application Priority Data

Jan. 19, 2017  (KR) .................. 10-2017-0009082
Nov. 13, 2017  (KR) .................. 10-2017-0150613

(51) Int. Cl.
*H02K 11/00* (2016.01)
*H02K 11/215* (2016.01)
(Continued)

(52) U.S. Cl.
CPC ......... *H02K 11/215* (2016.01); *G01D 5/2066* (2013.01); *B62D 5/0481* (2013.01)

(58) Field of Classification Search
CPC ...... H02K 11/215; H02K 11/30; H02K 1/276; H02K 29/08; H02K 1/278; H02K 5/1732;
(Continued)

(56) References Cited

U.S. PATENT DOCUMENTS 6,600,245 B1    7/2003  Yang et al.
2008/0211357 A1*  9/2008  Kataoka .............. H02K 11/215
                                                310/68 B
(Continued)

FOREIGN PATENT DOCUMENTS

CN        1447494 A      10/2003
CN        101257235 A     9/2008
(Continued)

OTHER PUBLICATIONS

Machine Translation, Sato, JP-2015226421-A, Dec. 2015. (Year: 2015).*

(Continued)

*Primary Examiner* — Thomas Truong
(74) *Attorney, Agent, or Firm* — Saliwanchik, Lloyd & Eisenschenk

(57) ABSTRACT

An embodiment relates to a sensing magnet assembly and a motor including the same, the sensing magnet assembly comprising: a sensing plate; a sensing magnet disposed on the plate; and an adhesive tape disposed between the sensing plate and the sensing magnet so as to fix the sensing magnet to the sensing plate, wherein the sensing plate includes a main body in which the adhesive tape is disposed, the main body includes a seating surface and a plurality of grooves or holes, and one side of the adhesive tape is disposed on the seating surface. Accordingly, the adhesive strength between the sensing magnet and the sensing plate can be improved.

13 Claims, 16 Drawing Sheets

(51) Int. Cl.
*G01D 5/20* (2006.01)
*B62D 5/04* (2006.01)

(58) Field of Classification Search
CPC .... H02K 7/14; H02K 2203/03; G01D 5/2066; G01D 5/2451; G01D 5/24442; B62D 5/0481; B62D 5/04
See application file for complete search history.

(56) References Cited

U.S. PATENT DOCUMENTS

| | | | | |
|---|---|---|---|---|
| 2013/0020916 A1* | 1/2013 | Kim | ............ | G01D 5/142 310/68 B |
| 2013/0026888 A1 | 1/2013 | Migita et al. | | |
| 2013/0200888 A1* | 8/2013 | Kim | ............ | G01B 7/30 324/207.25 |
| 2014/0167743 A1* | 6/2014 | Park | ............ | H02K 11/22 324/207.2 |

FOREIGN PATENT DOCUMENTS

| | | | |
|---|---|---|---|
| CN | 102891579 A | | 1/2013 |
| CN | 103872853 A | | 6/2014 |
| EP | 2 626 987 A2 | | 8/2013 |
| JP | S55-32616 U | | 3/1980 |
| JP | 2003-275683 A | | 9/2003 |
| JP | 2006-067698 A | | 3/2006 |
| JP | 2007-043814 A | | 2/2007 |
| JP | 2007-046287 A | | 2/2007 |
| JP | 2007-166840 A | | 6/2007 |
| JP | 2008-219996 A | | 9/2008 |
| JP | 2009-022096 A | | 1/2009 |
| JP | 2013-031298 A | | 2/2013 |
| JP | 2015-226421 A | | 12/2015 |
| JP | 2015226421 A | * | 12/2015 |
| KR | 10-2009-0050650 A | | 5/2009 |
| KR | 10-2013-0012446 A | | 2/2013 |
| KR | 10-2014-0078796 A | | 6/2014 |

OTHER PUBLICATIONS

International Search Report dated Apr. 19, 2018 in International Application No. PCT/KR2018/000546.
Office Action dated Jun. 30, 2020 in Japanese Application No. 2019-538247.
Office Action dated Aug. 31, 2020 in Chinese Application No. 201880007632.7.
Supplementary European Search Report dated Sep. 30, 2020 in European Application No. 18742169.8.

* cited by examiner

SENSING MAGNET ASSEMBLY, ROTOR POSITION SENSING APPARATUS, AND MOTOR INCLUDING SAME

CROSS-REFERENCE TO RELATED APPLICATIONS

This application is the U.S. national stage application of International Patent Application No. PCT/KR2018/000546, filed Jan. 11, 2018, which claims the benefit under 35 U.S.C. § 119 of Korean Patent Application Nos. 10-2017-0009082, filed Jan. 19, 2017; and 10-2017-0150613, filed Nov. 13, 2017, which are hereby incorporated by reference in their entirety.

TECHNICAL FIELD

The present invention relates to a sensing magnet assembly, a rotor position sensing apparatus, and a motor including the same.

BACKGROUND ART

Motors are apparatuses for obtaining rotational forces by converting electric energy into mechanical energy and are widely used in vehicles, household electronics, industrial equipment, and the like.

A motor may include a housing, a shaft, a stator disposed in the housing, a rotor installed on an outer circumferential surface of the shaft, and the like. Here, an electrical interaction between the stator of the motor and the rotor is induced to induce rotation of the rotor. In addition, the shaft is also rotated according to the rotation of the rotor.

Particularly, the motor may be used in an apparatus to secure steering stability of a vehicle. For example, the motor may be used in an electronic power steering system (EPS). In the case of the motor used in the EPS, demand for safety while a normal function is performed under an environment at a high temperature (150° C.), which is a characteristic of a vehicle part, is increasing.

In addition, a sensing magnet assembly disposed in the motor is installed to rotate in conjunction with the rotor and induces a magnetic element to detect a position of the rotor using a magnetic field of a magnet included in the sensing magnet assembly.

Such a sensing magnet assembly includes a plate having a disc shape and a magnet coupled to the plate. Generally, in the sensing magnet assembly, the magnet is coupled to an upper surface of the plate. Here, the plate may be referred to as a sensing plate. In addition, the magnet may be referred to as a sensing magnet.

The sensing magnet may be fixed to the sensing plate using an adhesive. However, there is a problem in that a coupling force between the sensing magnet and the sensing plate which are coupled using the adhesive is very weak under a high temperature, a high humidity, or a low temperature condition.

In addition, the plate and the magnet may be coupled using an adhesive tape (double sided tape). The adhesive tape fixes the magnet such that the magnet is not detached from the plate in axial and radial directions of the motor.

However, in a case in which the adhesive tape is used, there is a problem in that an adhesive force is reduced due to an air layer formed between the adhesive tape and the plate.

Therefore, in a case in which the motor is applied to the vehicle, there may be a problem in that the adhesive force of the adhesive tape is further reduced under an internal environment of the vehicle in which a temperature fluctuates between a high temperature and a low temperature. Accordingly, when the magnet is detached from the plate, since the motor is not driven, there may be a critical problem in safe driving of the vehicle.

DISCLOSURE

Technical Problem

The present invention is directed to providing a sensing magnet assembly in which a coupling force between a sensing magnet and a sensing plate is increased, a rotor position sensing apparatus, a motor including the same.

The present invention is directed to providing a motor including an air guide formed in a sensing magnet assembly to increase an adhesive force between a magnet and a plate.

The present invention is also directed to providing a motor capable of inhibiting the detachment of a magnet using a rib formed on a plate.

Objectives that can be achieved according to embodiments are not limited to the above described objectives, and other objectives which are not described above will be clearly understood by those skilled in the art from the following specification.

Technical Solution

One aspect of the present invention provides a sensing magnet assembly including: a plate; a magnet disposed on the plate; and an adhesive tape disposed between the plate and the magnet so as to fix the magnet to the plate, wherein the plate includes a body on which the adhesive tape is disposed, the body includes a seating surface and a plurality of grooves or holes, and one surface of the adhesive tape is disposed on the seating surface.

The hole may be formed to pass through the main body in an axial direction, and one side of the hole may be disposed at the seating surface.

The groove may be formed concavely in a downward direction in the seating surface and formed in a radial direction from a center of the main body.

One side of the groove may extend to an outer circumferential surface of the main body.

The plate of the sensing magnet assembly may further include a rib which extends upward from an outer circumferential surface of the main body.

A height of the rib based on the seating surface may be less than a height of the magnet.

The plate of the sensing magnet assembly may further include a protrusion which protrudes from an inner circumferential surface of the seating surface in the axial direction, and a height of the protrusion based on the seating surface may be less than a height of the rib.

The rib may include a plurality of protrusions disposed to be spaced apart from each other in a circumferential direction.

The plate may further include a rib which extends upward from the outer circumferential surface of the main body, wherein the rib may include a plurality of protrusions disposed to be spaced apart from each other in the circumferential direction, and one side of the groove which extends to the outer circumferential surface of the main body may be disposed between the protrusions.

An air layer may be formed between the groove or the hole and the adhesive tape.

The groove or the hole may be a groove or a hole for removing an air layer disposed between the adhesive tape and the seating surface.

Another aspect of the present invention provides a sensing magnet assembly including: a plate; a magnet disposed on the plate; and an adhesive tape disposed between the plate and the magnet so as to fix the magnet to the plate, wherein the plate includes a first region including a protrusion and a second region which extends from the first region and in which the adhesive tape is disposed, the second region of the plate includes two or more holes or grooves, and the holes or the grooves are rotationally symmetrical based on a center (C) of the plate.

Still another aspect of the present invention provides a motor including: a shaft; a rotor disposed outside the shaft; a stator disposed outside the rotor; a sensing magnet assembly disposed on the stator; and a sensor unit disposed on the sensing magnet assembly, wherein the sensing magnet assembly includes: a plate; a magnet disposed on the plate; and an adhesive tape disposed between the plate and the magnet so as to fix the magnet to the plate, the plate includes a main body on which the adhesive tape is disposed, the main body includes a seating surface and a plurality of grooves or holes, and one surface of the adhesive tape is disposed on the seating surface.

The hole may be formed to pass through the main body in an axial direction, and one side of the hole may be disposed at the seating surface.

The groove may be formed concavely in a downward direction in the seating surface and may be formed in a radial direction from a center of the main body.

One side of the groove may extend to an outer circumferential surface of the main body.

The motor may further include a rib which protrudes upward from the outer circumferential surface of the main body.

Yet another aspect of the present invention provides a rotor position sensing apparatus that includes a sensing plate, a sensing magnet disposed on an upper surface of the sensing plate, and a substrate disposed on the sensing magnet and further includes a can member coupled to the sensing magnet so as to surround the sensing magnet and coupled to the sensing plate.

The can member may include a first surface in contact with an inner circumferential surface of the sensing magnet, a second surface in contact with an upper surface of the sensing magnet, and a third surface in contact with an outer circumferential surface of the sensing magnet and an outer circumferential surface of the sensing plate.

The can member may include a fourth surface in contact with a lower surface of the sensing plate.

The sensing plate may include a coupling groove concavely formed in the lower surface of the sensing plate and may be disposed in the coupling groove in which a protrusion of the fourth surface is positioned.

The sensing plate may include a seating portion concavely formed in an upper surface of the sensing plate, and the sensing magnet may be disposed on the seating portion.

A height of the first surface based on the second surface may be less than a thickness of the sensing magnet.

The height of the first surface may be less than a height from the seating portion to the upper surface of the sensing plate.

The sensing plate may include a shaft coupling portion having a cylindrical shape in which a hole is disposed.

A height of the third surface based on the second surface may be greater than the sum of a thickness of the sensing magnet and a thickness of a seating portion of the sensing plate and less than a height from the lower surface of the sensing plate to an upper end of the shaft coupling portion.

The sensing magnet may include a main magnet and a sub-magnet, and the substrate may include a first sensor and a second sensor, wherein the first sensor may be disposed to correspond to the main magnet in a radial direction of the sensing magnet, and the second sensor may be disposed to correspond to the sub-magnet in the radial direction of the sensing magnet.

Yet another aspect of the present invention provides a motor including a shaft, a rotor including a hole in which the shaft is disposed, a stator disposed outside the rotor, and rotor position sensing apparatus disposed on the rotor, wherein the rotor position sensing apparatus includes a sensing plate coupled to the shaft, a sensing magnet disposed on an upper surface of the sensing plate, and substrate disposed on the sensing magnet and further includes a can member coupled to the sensing magnet so as to surround the sensing magnet, and coupled to the sensing plate.

Advantageous Effects

According to an embodiment, an advantageous effect is provided in that a coupling force between a sensing magnet and a sensing plate is increased.

In a motor according to the embodiment, a hole or groove is formed in a plate of a sensing magnet assembly to inhibit the formation of an air layer between a magnet and a plate. Therefore, an adhesive force between the magnet and the plate can be increased.

In addition, the detachment of the magnet can be inhibited using a rib formed on the plate.

In the motor according to the embodiment, since a can member, which covers the sensing magnet, is caulk-coupled to the sensing plate, an advantageous effect is provided in that the coupling force between the sensing magnet and the sensing plate is further increased.

MODES OF THE INVENTION

Figure 1:
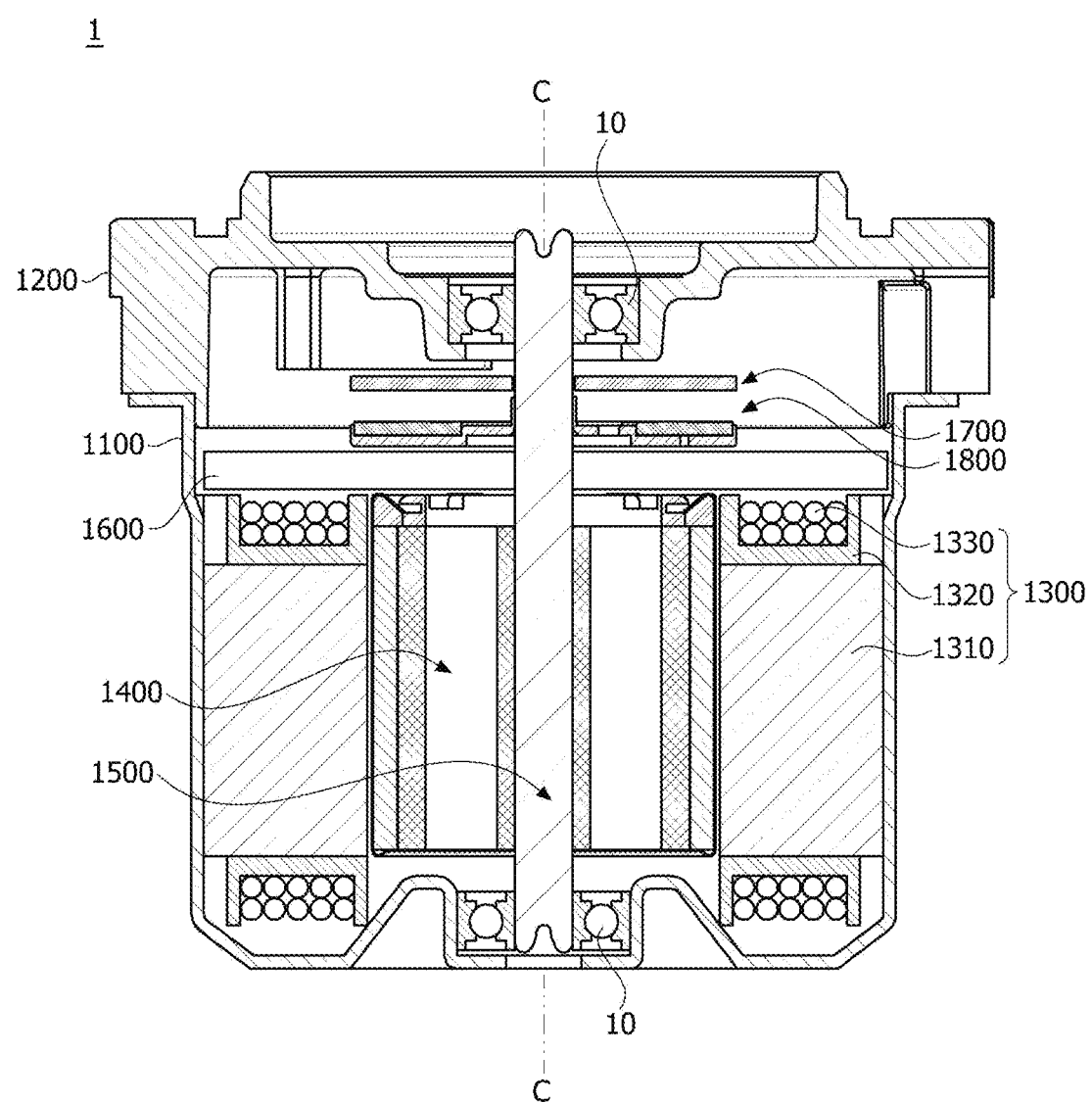
FIG. 1 is a view illustrating a motor according to a first embodiment.

As the present invention allows for various changes and numerous embodiments, specific embodiments will be illustrated in the drawings and described in detail in the written description. However, this is not intended to limit the present invention to specific embodiments, and it is to be appreciated that all changes, equivalents, and substitutes that do not depart from the spirit and technical scope of the present invention are encompassed in the present invention.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. As used herein, the term "and/or" includes combinations or any one of a plurality of associated listed items.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements.

In a description of the embodiment, in a case in which any one element is described as being formed on (or under) another element, such a description includes both a case in which the two elements are formed to be in direct contact with each other and a case in which the two elements are in indirect contact with each other such that one or more other elements are interposed between the two elements. In addition, when one element is described as being formed on (or under) another element, such a description may include a case in which the one element is formed at an upper side or a lower side with respect to another element.

The terminology used herein to describe embodiments of the present invention is not intended to limit the scope of the present invention. The articles "a" and "an" are singular in that they have a single referent, however the use of the singular form in the present document should not preclude the presence of more than one referent. In other words, elements of the present invention referred to in the singular may number one or more, unless the context clearly indicates otherwise. It will be further understood that the terms "comprise," "comprising," "include," and/or "including," when used herein, specify the presence of stated features, numbers, steps, operations, elements, components, and/or combinations thereof, but do not preclude the presence or addition of one or more other features, numbers, steps, operations, elements, components, and/or combinations thereof.

Unless otherwise defined, all terms (including technical and scientific terms) used herein are to be interpreted as is customary in the art to which this invention belongs. It should be further understood that terms in common usage should also be interpreted as is customary in the relevant art and not in an idealized or overly formal sense unless expressly so defined herein.

Example embodiments of the invention will be described below in more detail with reference to the accompanying drawings. Components that are the same or correspond to each other are denoted by the same reference numeral regardless of the figure number, and redundant description will be omitted.

First Embodiment

FIG. 1 is a view illustrating a motor according to a first embodiment.

Referring to FIG. 1, a motor 1 according to the first embodiment may include a housing 1100 in which an opening is formed at one side thereof, a cover 1200 disposed on the housing 1100, a stator 1300 disposed in the housing 1100, a rotor 1400 disposed inside the stator 1300, a shaft 1500 which rotates with the rotor 1400, a busbar 1600 disposed on the stator 1300, a sensor unit 1700 configured to detect rotation of the rotor 1400 and the shaft 1500, and a sensing magnet assembly 1800 according to an embodiment. Here, the sensor unit 1700 and the sensing magnet assembly 1800 may be referred to as a rotor position sensing apparatus.

The motor 1 may be a motor used in an electronic power steering system (EPS). The EPS supplements a steering force with a driving force of the motor to secure turning stability and provide a quick restoring force so that a driver can safely drive.

The housing 1100 and the cover 1200 may form an exterior of the motor 1. In addition, the housing 1100 and the cover 1200 may be coupled so that an accommodation space may be formed. Accordingly, as illustrated in FIG. 1, the stator 1300, the rotor 1400, the shaft 1500, the busbar 1600, the sensor unit 1700, the sensing magnet assembly 1800, and the like may be disposed in the accommodation space. Here, the shaft 1500 is rotatably disposed in the accommodation space. Accordingly, the motor 1 may further include bearings 10 disposed around upper and lower portions of the shaft 1500.

The housing 1100 may be formed in a cylindrical shape. Here, a shape and a material of the housing 1100 may be variously changed. For example, the housing 1100 may be formed of a metal material which may easily withstand a high temperature.

The cover 1200 may be disposed at an opening side of the housing 1100, that is, disposed on the housing 1100, to cover the opening of the housing 1100.

The stator 1300 may be accommodated in the housing 1100. In addition, an electrical interaction is induced between the stator 1300 and the rotor 1400. Here, the stator 1300 may be disposed outside the rotor 1400 in a radial direction.

Referring to FIG. 1, the stator 1300 may include a stator core 1310, an insulator 1320 disposed on the stator core 1310, and a coil 1330 wound around the insulator 1320.

The stator core 1310 may be an integrated core formed in a ring shape or a core in which a plurality of separate cores are coupled. For example, the stator core 1310 may be formed in a shape in which a plurality of plates having a thin circular steel plate shape are stacked or one cylindrical shape.

The insulator 1320 may be disposed on the stator core 1310 to insulate the stator core 1310 from the coil 1330. Here, the insulator 1320 may be formed of a resin material.

The coil 1330 may be wound around the insulator 1320. In addition, the coil 1330 may generate a rotating magnetic field when power is supplied thereto.

Here, an end portion of the coil 1330 wound around the insulator 1320 may be disposed to be exposed at an upper side. In addition, the end portion of the coil 1330 may be coupled to the busbar 1600.

The rotor 1400 may be disposed inside the stator, and the shaft 1500 may be coupled to a central portion of the rotor 1400. Here, the rotor 1400 may be rotatably disposed inside the stator 1300.

The rotor 1400 may include a rotor core and magnets. The rotor core may be formed in a shape in which a plurality of plates having a thin circular steel plate shape are stacked or one cylindrical shape. A hole to which the shaft 1500 is coupled may be formed at a center of the rotor core. A protrusion which guides the magnets may protrude from an outer circumferential surface of the rotor core. The magnets may be attached to the outer circumferential surface of the rotor. The plurality of magnets may be disposed at predetermined intervals along a circumference of the rotor core. In addition, the rotor 1400 may also be formed in a type in which the magnets are inserted into pockets of the rotor core.

Accordingly, the rotor 1400 is rotated due to the electrical interaction between the coil 1330 and the magnet, and when the rotor 1400 is rotated, the shaft 1500 is rotated to generate a driving force.

Meanwhile, the rotor 1400 may further include a can member disposed to surround the magnets. The can member fixes the magnets such that the magnets are not detached from the rotor core. In addition, the can member may block the magnets from being exposed to the outside.

The shaft 1500 may be disposed in the housing 1100 to be rotatable due to the bearing 10.

The busbar 1600 may be disposed on the stator 1300.

In addition, the busbar 1600 may be electrically connected to the coil 1330 of the stator 1300.

The busbar 1600 may include a busbar main body and a terminal disposed in the busbar main body. Here, the busbar main body may be a molded part formed by injection molding. In addition, one side of the terminal may be electrically connected to the coil 1330.

The sensor unit 1700 may detect rotation of the shaft 1500 by detecting a magnetic force of the sensing magnet assembly 1800 installed to rotate in conjunction with the rotor 1400 to check a present position of the rotor 1400.

The sensor unit 1700 may be disposed on the sensing magnet assembly 1800.

The sensor unit 1700 may include a printed circuit board (PCB, not shown) and a sensor (not shown).

The sensor may be disposed on the PCB. The sensor detects a magnetic force of a magnet disposed in the sensing magnet assembly 1800. Here, a Hall integrated circuit (IC) may be provided as the sensor. In addition, the sensor may detect changes of N- and S-poles of the magnet disposed in the sensing magnet assembly 1800 and generate a sensing signal.

Figure 2:
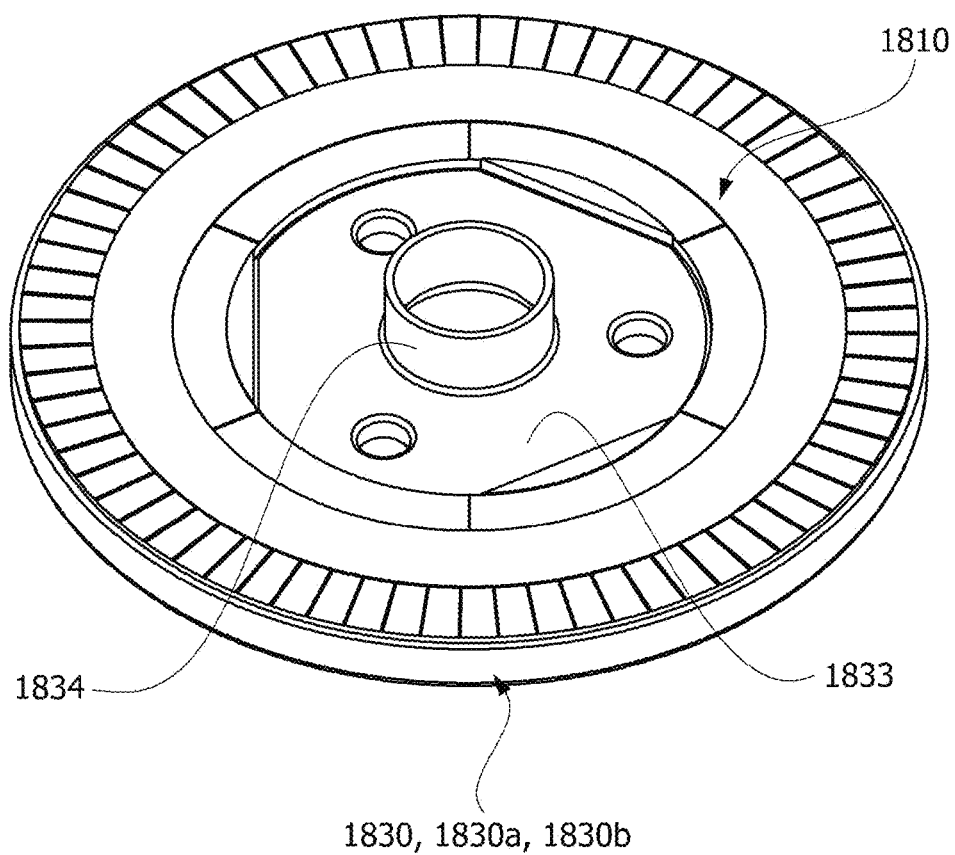
FIG. 2 is a perspective view illustrating a sensing magnet assembly of the motor according to the first embodiment.
Figure 3:
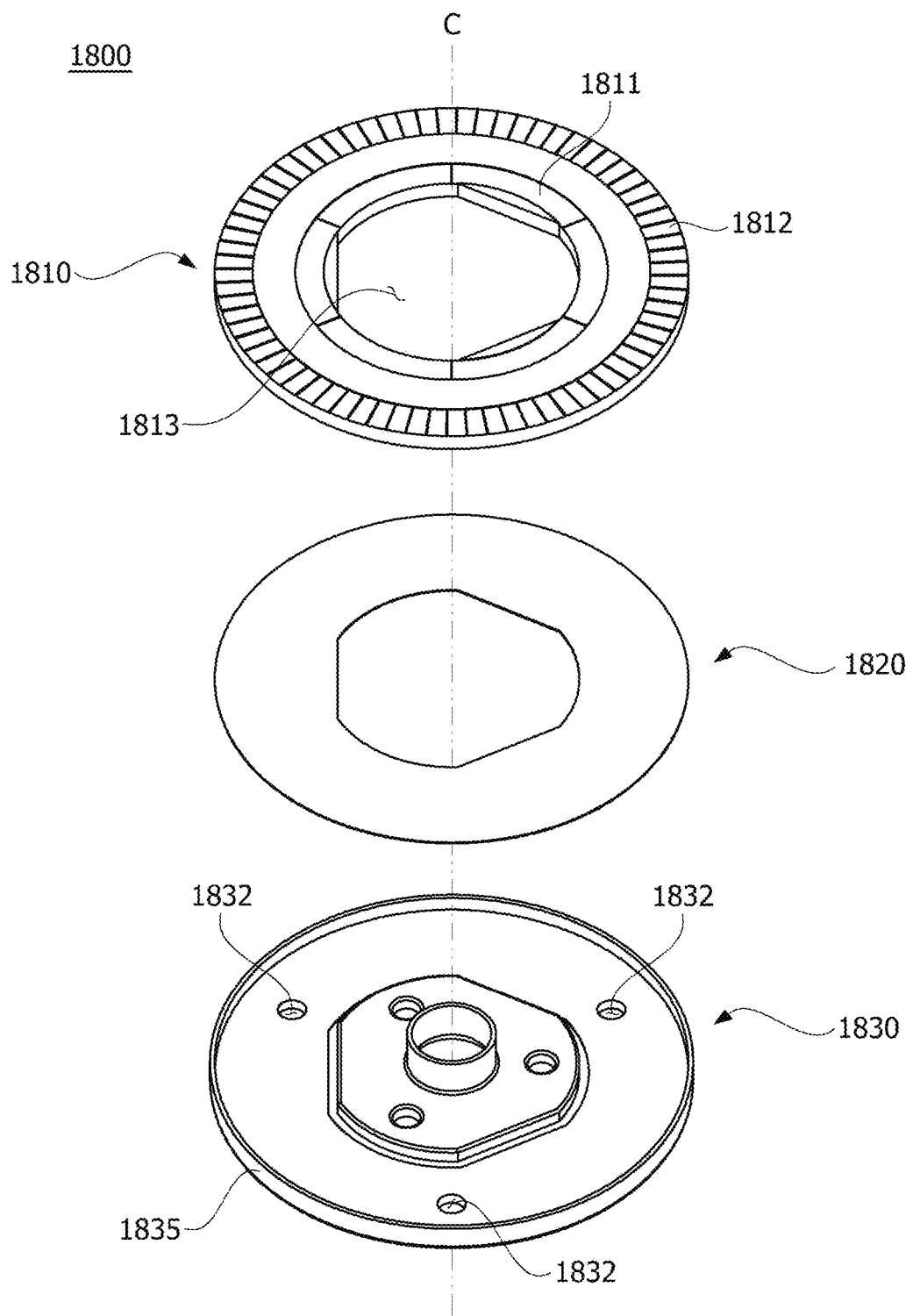
FIG. 3 is an exploded perspective view illustrating the sensing magnet assembly of the motor according to the first embodiment.
Figure 4:
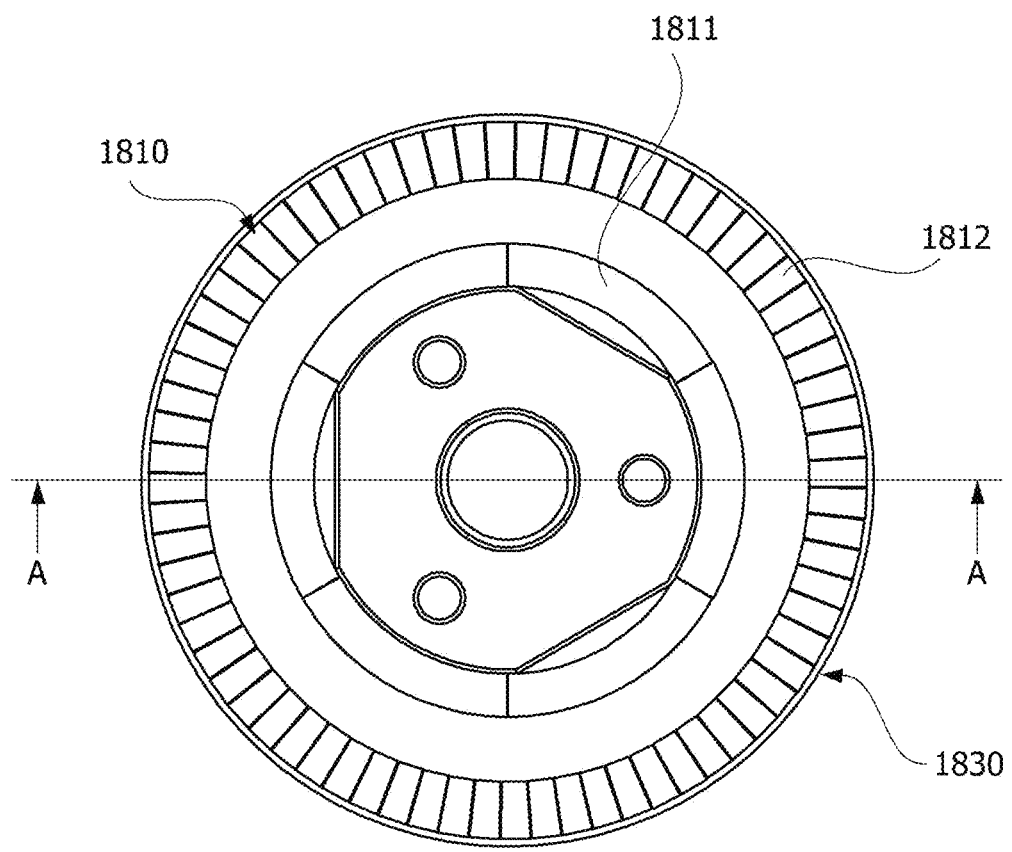
FIG. 4 is a plan view illustrating the sensing magnet assembly of the motor according to the first embodiment.
Figure 5:
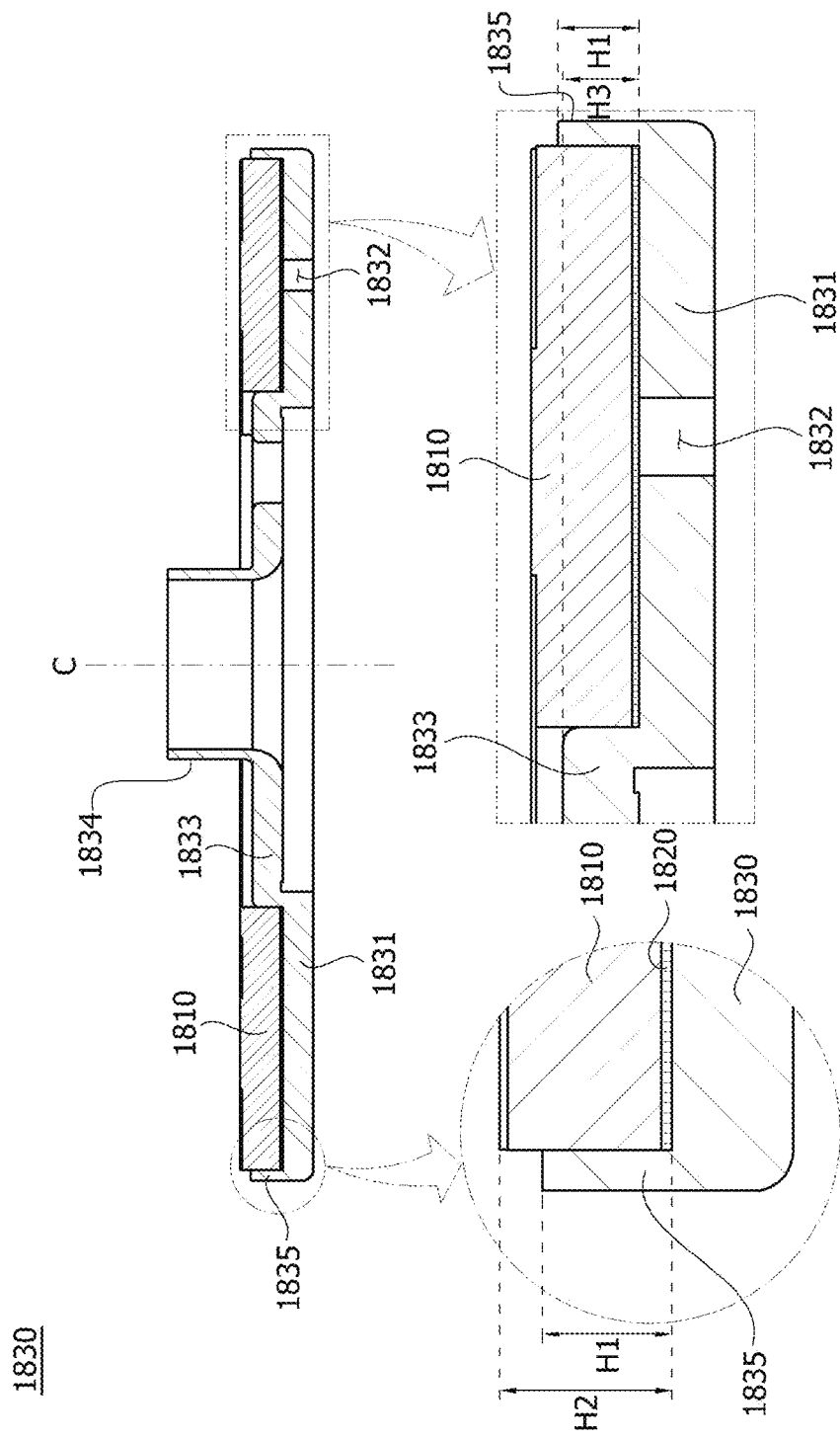
FIG. 5 is a cross-sectional view illustrating the sensing magnet assembly of the motor according to the first embodiment.

FIG. 2 is a perspective view illustrating a sensing magnet assembly of the motor according to the first embodiment, FIG. 3 is an exploded perspective view illustrating the sensing magnet assembly of the motor according to the first embodiment, FIG. 4 is a plan view illustrating the sensing magnet assembly of the motor according to the first embodiment, and FIG. 5 is a cross-sectional view illustrating the sensing magnet assembly of the motor according to the first embodiment.

Referring to FIGS. 2 to 5, the sensing magnet assembly 1800 may include a magnet 1810, an adhesive tape 1820, and a plate 1830. Here, the magnet 1810 may be referred to as a sensing magnet. In addition, the plate 1830 may be referred to as a sensing plate.

The plate 1830 according to a first example is disposed as an example of the plate, but the plate is not limited thereto. For example, the sensing magnet assembly 1800 may also include a plate 1830*a* or 1830*b* according to a second or third example of the plate and is disposed instead of the plate 1830 according to the first embodiment.

The magnet 1810 may be fixed on the plate 1830 using the adhesive tape 1820. The magnet 1810 rotates in conjunction with the shaft 1500 when the plate 1830 rotates. Here, the magnet 1810 may be disposed to be spaced apart from the sensor of the sensor unit 1700. Accordingly, the sensor may detect a change in magnetic flux of the magnet 1810 and calculate a rotation angle of the rotor 1400.

The magnet 1810 may be formed in a disc shape corresponding to a shape of the plate 1830 and may include a main magnet 1811 disposed at a center thereof and a sub-magnet 1812 disposed at an edge thereof. A dummy region which does not have magnetic properties may be formed between the main magnet 1811 and the sub-magnet 1812. Accordingly, the main magnet 1811 may be formed to be spaced apart from the sub-magnet 1812 by a width of the dummy region. In addition, the magnet 1810 may include an insertion hole 1813 formed at a center of the main magnet 1811.

The main magnet 1811 may be formed in a ring shape. Here, the main magnet 1811 may be provided as a plurality of split magnets. In a case in which the main magnet 1811 is formed as the split magnets, the number of split magnets (poles) may be equal to the number of magnets (poles) disposed in the rotor 1400 to detect rotation of the rotor.

The sub-magnet 1812 may be disposed outside the main magnet 1811 and may include a larger number of magnets (poles) than the number of magnets (poles) of the main magnet 1811. Accordingly, one pole of the sub-magnet 1812 is matched with a subdivision of one pole of the main magnet 1811. Accordingly, an amount of rotation of the rotor 1400 may be more precisely detected and measured. The dummy region which does not have the magnetic properties may be formed between the main magnet 1811 and the sub-magnet 1812. Accordingly, the main magnet 1811 and the sub-magnet 1812 may be formed to be spaced apart from each other by the width of the dummy region.

The insertion hole 1813 may be formed at a center of the main magnet 1811. In addition, a protrusion 1833 of the plate 1830 may be disposed in the insertion hole 1813. Here, a shape of the insertion hole 1813 corresponds to a shape of the protrusion 1833. Accordingly, the magnet 1810 may be fixed to the plate 1830 in a circumferential direction.

Meanwhile, a ferrite rubber may be used as the magnet 1810.

The adhesive tape 1820 fixes the magnet 1810 to the plate 1830. The adhesive tape 1820 is disposed between the magnet 1810 and the plate 1830. Here, a double sided tape may be used as the adhesive tape 1820. In addition, one surface of the adhesive tape 1820 may be disposed to adhere to a seating surface 1831*a* of the plate 1830.

When the adhesive tape 1820 adheres to the seating surface 1831*a*, an air layer may be formed, but the air layer may be removed using holes 1832 or grooves 1832*a*, which are provided as air guides, in the sensing magnet assembly 1800.

Hereinafter, the plate 1830, 1830*a*, or 1830*b* of the sensing magnet assembly 1800 in which the holes 1832 or grooves 1832*a* are formed will be described.

Figure 6:
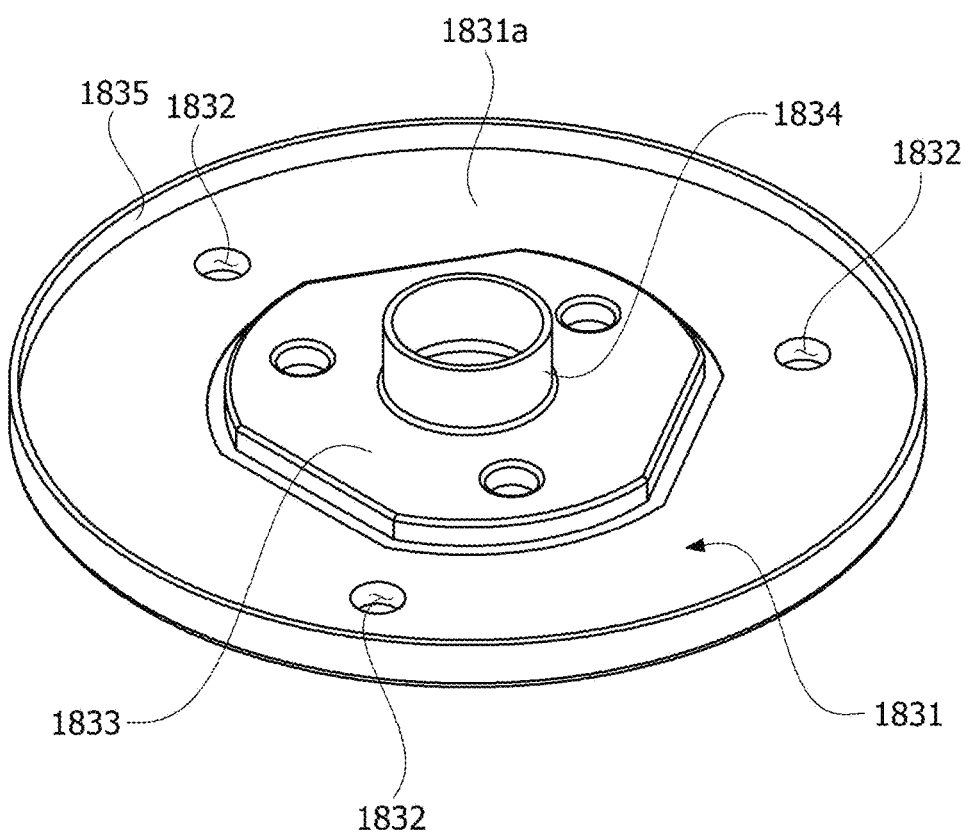
FIG. 6 is a view illustrating a first example of a plate disposed in the motor according to the first embodiment.

FIG. 6 is a view illustrating the first example of the plate disposed in the motor according to the first embodiment.

The plate 1830 according the first example of the plate will be described with reference to FIG. 6. The plate 1830 may include a main body 1831, the holes 1832, the protrusion 1833, and a sleeve 1834. In addition, the plate 1830 may further include a rib 1835. Here, the plate 1830 may be referred to as the sensing plate.

The main body 1831, the holes 1832, the protrusion 1833, the sleeve 1834, and the rib 1835 may be integrally formed. Here, the plate 1830 may be formed of an electroplated steel sheet.

The main body 1831 may be formed in a disc shape. Here, the adhesive tape 1820 may be disposed on the seating surface 1831*a* of the main body 1831.

In addition, the protrusion 1833 is formed to extend from an inner circumferential surface of the seating surface 1831*a* in an axial direction. Here, an upper surface of the protrusion 1833 may be disposed to be higher than the seating surface 1831*a*. Here, the axial direction may be a longitudinal direction of the shaft 1500.

As an example, the protrusion 1833 may be formed in a triangular column shape having three side surfaces and three corners. Here, the corners may be formed to have a round shape with a predetermined curvature to facilitate machining and inhibit damage due to impact. Here, the protrusion 1833 has the triangular column shape as an example, but is not limited thereto, and may also be formed in a shape, such as, quadrilateral, pentagonal, hexagonal, or octagonal column shape, or the like having a plurality of sides and a plurality of corners.

A hole, which is formed to pass through the protrusion 1833 in a thickness direction and into which the shaft 1500 is inserted, is formed at a center of the protrusion 1833. Since the shaft 1500 is fitted inside the hole, the shaft 1500 and the sensing magnet assembly 1800 may rotate together.

As illustrated in FIGS. 5 and 6, the sleeve 1834 may be disposed to increase a coupling force between the shaft 1500 and the sensing magnet assembly 1800. Here, the sleeve 1834 may be formed in a cylindrical shape and integrally formed with the protrusion 1833 at an inner side of the protrusion 1833. In addition, a plurality of protrusions (not shown) may also be formed on an inner circumferential surface of the sleeve 1834 to further increase the coupling force between the shaft 1500 and the sensing magnet assembly 1800.

The holes 1832 may be formed between the protrusion 1833 and the rib 1835.

When the adhesive tape 1820 is disposed on the seating surface 1831*a*, the holes 1832 serve as passages through which air is discharged.

As illustrated in FIG. 6, the plurality of holes 1832 may be formed to pass through the main body 1831 in the axial direction. For example, one side of each of the holes 1832 is disposed at the seating surface 1831*a* and the other side is disposed at a lower portion of the main body 1831.

Accordingly, air of the air layer formed when the adhesive tape 1820 is disposed on the seating surface 1831*a* may be discharged through the holes 1832. Meanwhile, the holes 1832 may also be used to test an adhesive force of the magnet 1810.

Here, the holes 1832 may be disposed between the protrusion 1833 and the rib 1835. In addition, the holes 1832 may be disposed under the adhesive tape 1820. Here, as an example, three holes 1832 are formed to be spaced 120° from each other around a center C, but the present invention is not limited thereto.

The rib 1835 inhibits the detachment of the magnet 1810. For example, when the sensing magnet assembly 1800 rotates, the detachment of the magnet 1810 due to a centrifugal force is inhibited by the rib 1835. In addition, even when the magnet 1810 is damaged and a cracking phenomenon occurs in the magnet 1810, since the rib 1835 supports an outer circumferential surface of the magnet 1810 with the adhesive tape 1820, the detachment of a portion of the magnet 1810 due to the centrifugal force is inhibited.

The rib 1835 may protrude in the axial direction like the protrusion 1833. Here, the rib 1835 may protrude upward from an edge of the main body 1831. Specifically, the rib 1835 may protrude upward from an outer circumferential surface 1831*b* of the main body 1831. Accordingly, the performance of the sensing magnet assembly 1800 may be improved due to the rib 1835.

As illustrated in FIG. 6, in a case in which the protrusion 1833 and the rib 1835 are formed on the plate 1830, a structure is formed in which it is difficult to discharge air generated when the adhesive tape 1820 is adhered thereto. However, the air can be easily discharged to the outside through the holes 1832.

As illustrated in FIG. 5, the rib 1835 may be formed to have a height H1 which is less than a height H2 of the magnet 1810 based on the seating surface 1831*a* by considering the sensing capability of the sensor configured to detect the magnet 1810. Here, a height H3 of protrusion 1833 is less than the height H1 of the rib 1835.

Figure 7:
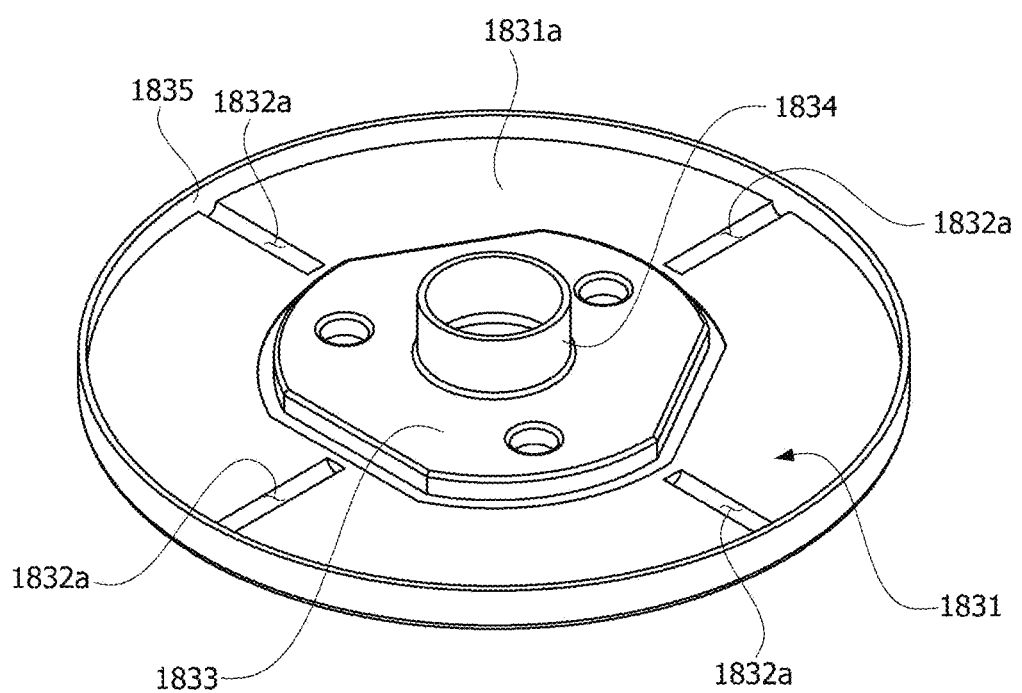
FIG. 7 is a view illustrating a second example of the plate disposed in the motor according to the first embodiment.

FIG. 7 is a view illustrating a second example of the plate disposed in the motor according to the first embodiment.

When the plate 1830*a* according the second example of the sensing plate is described with reference to FIG. 7, since components, which are the same as those of the plate 1830 according to the first example of the plate are denoted by the same numerals, specific descriptions related thereto will be omitted.

Referring to FIG. 7, the plate 1830*a* may include a main body 1831, grooves 1832*a*, a protrusion 1833, and a sleeve 1834. In addition, the plate 1830*a* may further include a rib 1835.

When the plate 1830*a* according to the second example of the sensing plate is compared with the plate 1830 according to the first example of the plate with reference to FIG. 7, the plate 1830*a* according to the second example of the sensing plate is differentiated therefrom by the grooves 1832*a*.

The grooves 1832*a* of the plate 1830*a* may be disposed between the protrusion 1833 and the rib 1835.

The plurality of grooves 1832*a* may be provided. In addition, the grooves 1832*a* may be disposed under an adhesive tape 1820.

As illustrated in FIG. 7, the grooves 1832*a* may be concavely formed in a seating surface 1831*a* in a radial direction. In addition, the grooves 1832*a* may be disposed to be spaced a predetermined distance from each other. Accordingly, air may be accommodated in the grooves 1832*a*. In addition, the grooves 1832*a* may also be concavely formed, in a circumferential direction like an arc shape, in the seating surface 1831*a*.

Accordingly, when the adhesive tape 1820 is disposed on the seating surface 1831a, the grooves 1832a serve as cavities capable of accommodating air.

Here, as an example, four grooves 1832a are formed to be spaced 90° from each other around a center C, but the present invention is not limited thereto.

As illustrated in FIG. 7, in a case in which the protrusion 1833 and the rib 1835 are formed on the plate 1830a, a structure is formed in which it is difficult to discharge air, generated when the adhesive tape 1820 is adhered thereto, in the radial direction. Accordingly, since the air is accommodated in the grooves 1832a, a lifting phenomenon of the adhesive tape 1820 may be inhibited. Accordingly, an adhesive force of the adhesive tape 1820 can be increased.

Figure 8:
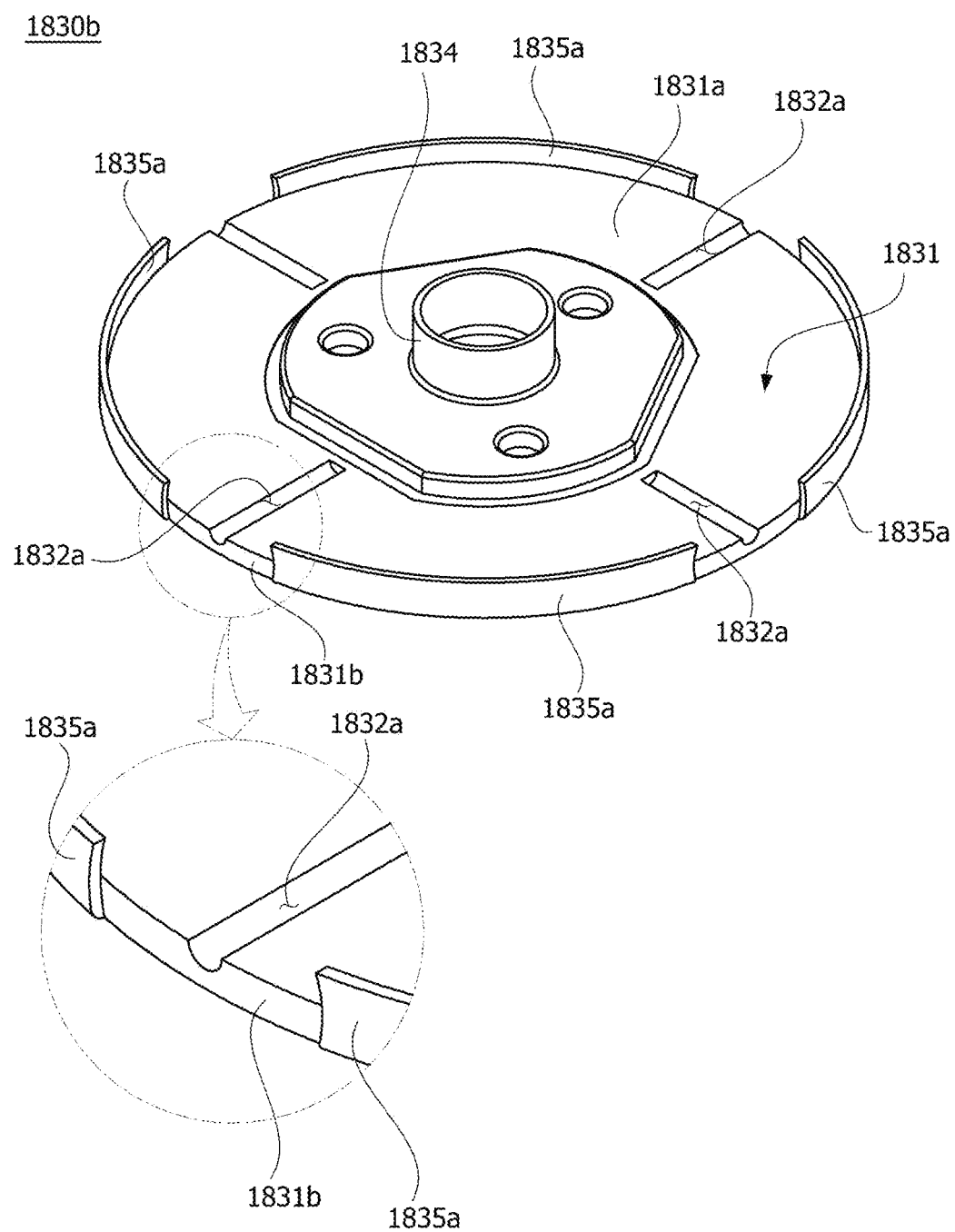
FIG. 8 is a view illustrating a third example of a plate disposed in the motor according to the first embodiment.

FIG. 8 is a view illustrating the third example of the plate disposed in the motor according to the first embodiment.

When the plate 1830b according to the third example of the plate is described with reference to FIG. 8, since components, which are the same as those of the plate 1830 or 1830a according to the first or second example of the plate, are denoted by the same numerals, specific descriptions related thereto will be omitted.

Referring to FIG. 8, the plate 1830b may include a main body 1831, grooves 1832a, a protrusion 1833, and a sleeve 1834. In addition, the plate 1830b may further include ribs 1835a.

When the plate 1830b according to the third example of the plate is compared with the plate 1830a according to the second example of the plate with reference to FIG. 8, the plate 1830b according to the third example of the plate is differentiated therefrom in that the grooves 1832a extend to an outer circumferential surface 1831b of the main body 1831 and the ribs 1835a are provided as a plurality of protrusions.

The grooves 1832a of the plate 1830b may be disposed between the protrusion 1833 and the outer circumferential surface 1831b of the main body 1831. Here, the plurality of grooves 1832a may be provided. In addition, the grooves 1832a may be disposed under an adhesive tape 1820.

As illustrated in FIG. 8, the grooves 1832a may be concavely formed in a seating surface 1831a in a radial direction. In addition, the grooves 1832a may be disposed to be spaced a predetermined distance from each other. Here, one side of each of the grooves 1832a of the plate 1830b according to the third example of the plate may extend to the outer circumferential surface 1831b of the main body 1831. Accordingly, air may be guided to the outside through the grooves 1832a.

Accordingly, when the adhesive tape 1820 is disposed on the seating surface 1831a, the grooves 1832a of the plate 1830b serve as channels configured to guide the air to the outside.

Here, as an example, four grooves 1832a are formed to be spaced 90° from each other around a center C, but the present invention is not limited thereto.

As illustrated in FIG. 7, in a case in which the rib 1835 is formed in a cylindrical or ring shape on the plate 1830a, a structure is formed in which it is difficult to discharge air, generated when the adhesive tape 1820 is adhered thereto, in the radial direction.

However, as illustrated in FIG. 8, since one side of each of the grooves 1832a of the plate 1830b extends to the outer circumferential surface 1831b of the main body 1831, the air can be effectively discharged to the outside.

Meanwhile, the ribs 1835a may be provided as the plurality of protrusions disposed to be spaced apart from each other in a circumferential direction.

Here, the protrusions may be formed to protrude upward from the outer circumferential surface 1831b of the main body 1831. Accordingly, since air generated when the adhesive tape 1820 is adhered thereto may be discharged through spaces between the protrusions, an adhesive force of the adhesive tape 1820 can be increased.

As illustrated in FIG. 8, one side of each of the grooves 1832a may be disposed between the protrusions.

Meanwhile, as described above, the sensing magnet assembly 1800 may include the plate 1830, 1830a, or 1830b, the magnet 1810 disposed on the plate 1830, 1830a, or 1830b, and the adhesive tape 1820 which is disposed between the plate and the magnet 1810 and fixes the magnet 1810 to the plate 1830, 1830a, or 1830b.

Here, the plate 1830, 1830a, or 1830b may include a first region and a second region. Here, the first region and the second region may be divided on the basis of the main body 1831 and the protrusion 1833. For example, a region including the protrusion 1833 is referred to as the first region, and a region of the main body 1831 in which the adhesive tape 1820 is disposed is referred to as the second region.

Accordingly, the second region may be formed to extend outward from the first region. Here, the holes 1832 or grooves 1832a may be formed in the second region.

In addition, the holes 1832 or grooves 1832a may be disposed to be rotationally symmetrical based on the center C. Accordingly, when the sensing magnet assembly 1800 rotates, balance and reliability may be improved based on rotation of the sensing magnet assembly 1800.

Second Embodiment

Figure 9:
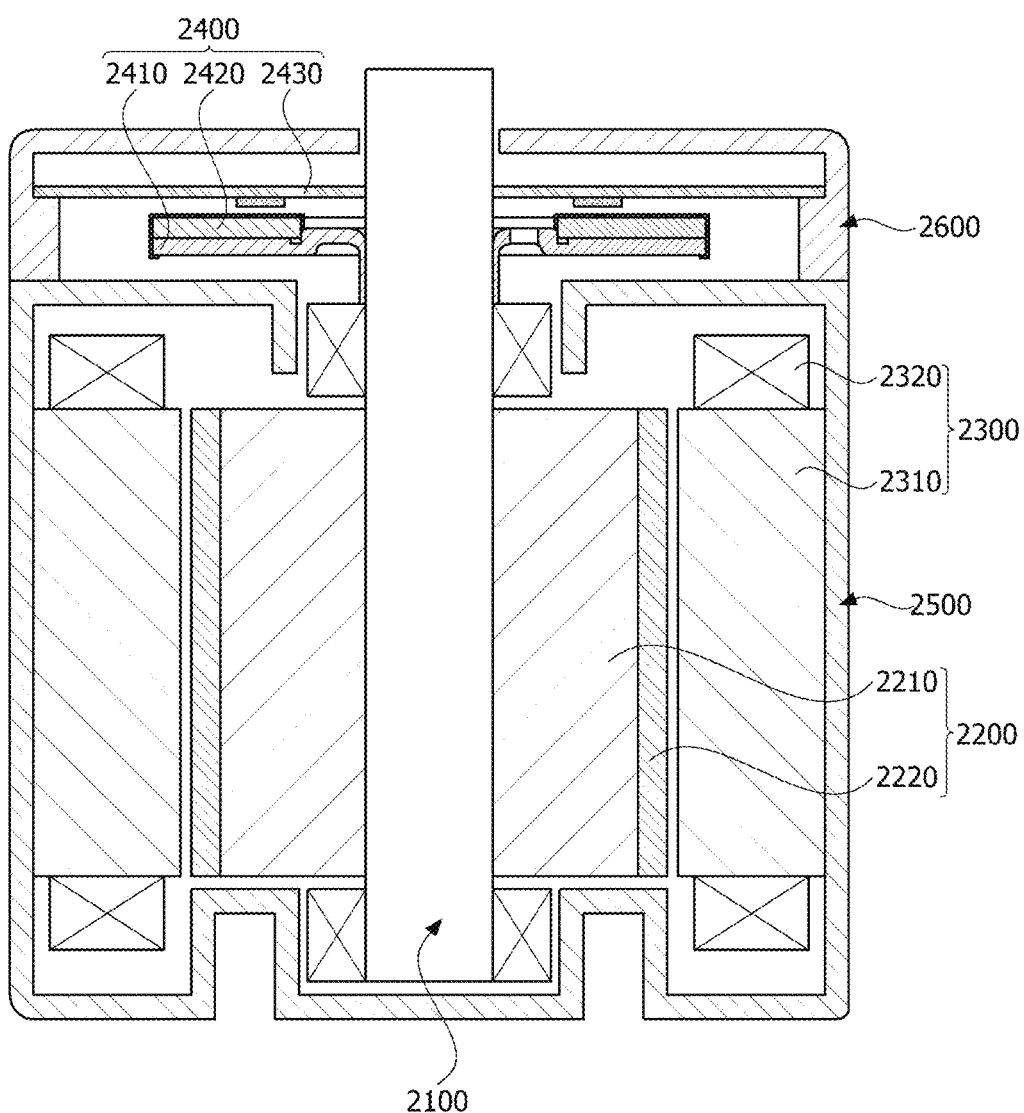
FIG. 9 is a conceptual view illustrating a motor according to a second embodiment.

FIG. 9 is a conceptual view illustrating a motor according to a second embodiment. Referring to FIG. 9, a motor 2 according to a second embodiment may include a shaft 2100, a rotor 2200, a stator 2300, and a rotor position sensing apparatus 2400.

The shaft 2100 may be coupled to the rotor 2200. When an electromagnetic interaction occurs between the rotor 2200 and the stator 2300 due to a current supplied thereto, the rotor 2200 rotates, and the shaft 2100 rotates in conjunction with the rotor 2200. The shaft 2100 may be connected to a steering shaft of a vehicle and may transmit power to the steering shaft. The shaft 2100 may be supported by bearings.

The rotor 2200 rotates due to an electrical interaction with the stator 2300.

The rotor 2200 may include a rotor core 2210 and magnets 2220. The rotor core 2210 may be formed in a shape in which a plurality of plates having a thin circular steel plate shape are stacked or one cylindrical shape. A hole to which the shaft 2100 is coupled may be formed at a center of the rotor core 2210. A protrusion which guides the magnets 2220 may protrude from an outer circumferential surface of the rotor core 2210. The magnets 2220 may be attached to the outer circumferential surface of the rotor core 2210. The plurality of magnets 2220 may be disposed at predetermined intervals along a circumference of the rotor core 2210. The rotor 2200 may include a can member which fixedly surrounds the magnets 2220 so that the magnets 2220 are not detached from the rotor core 2210 and the magnets 2220 are blocked from being exposed.

A coil may be wound around the stator 2300 to induce an electrical interaction between the stator 2300 and the rotor 2200. A specific structure of the stator 2300 for winding the coil therearound will be described below. The stator 2300 may include a stator core including a plurality of teeth. A yoke portion having a ring shape may be provided in the stator core, and the teeth around which the coil is wound from the yoke toward a center may be provided. The teeth may be provided at predetermined intervals along an outer circumferential surface of the yoke portion. Meanwhile, a plurality of plates having a thin steel plate shape may be stacked on each other to form the stator core. In addition, a plurality of separate cores may also be coupled or connected to each other to form the stator core.

The rotor position sensing apparatus 2400 may include a sensing plate 2410, a sensing magnet 2420, and a substrate 2430. The sensing magnet assembly 1800 of the motor 1 according to the first embodiment may also be disposed instead of the sensing plate 2410 and the sensing magnet 2420 of the rotor position sensing apparatus 2400.

A housing 2500 is formed in a cylindrical shape, and a space in which the stator 2300 and the rotor 2200 may be installed is provided therein. Here, a shape and a material of the housing 2500 may be variously changed, and a metal material capable of withstanding a high temperature may be selected for the housing 2500. An open upper portion of the housing 2500 is covered by a cover 2600.

Figure 10:
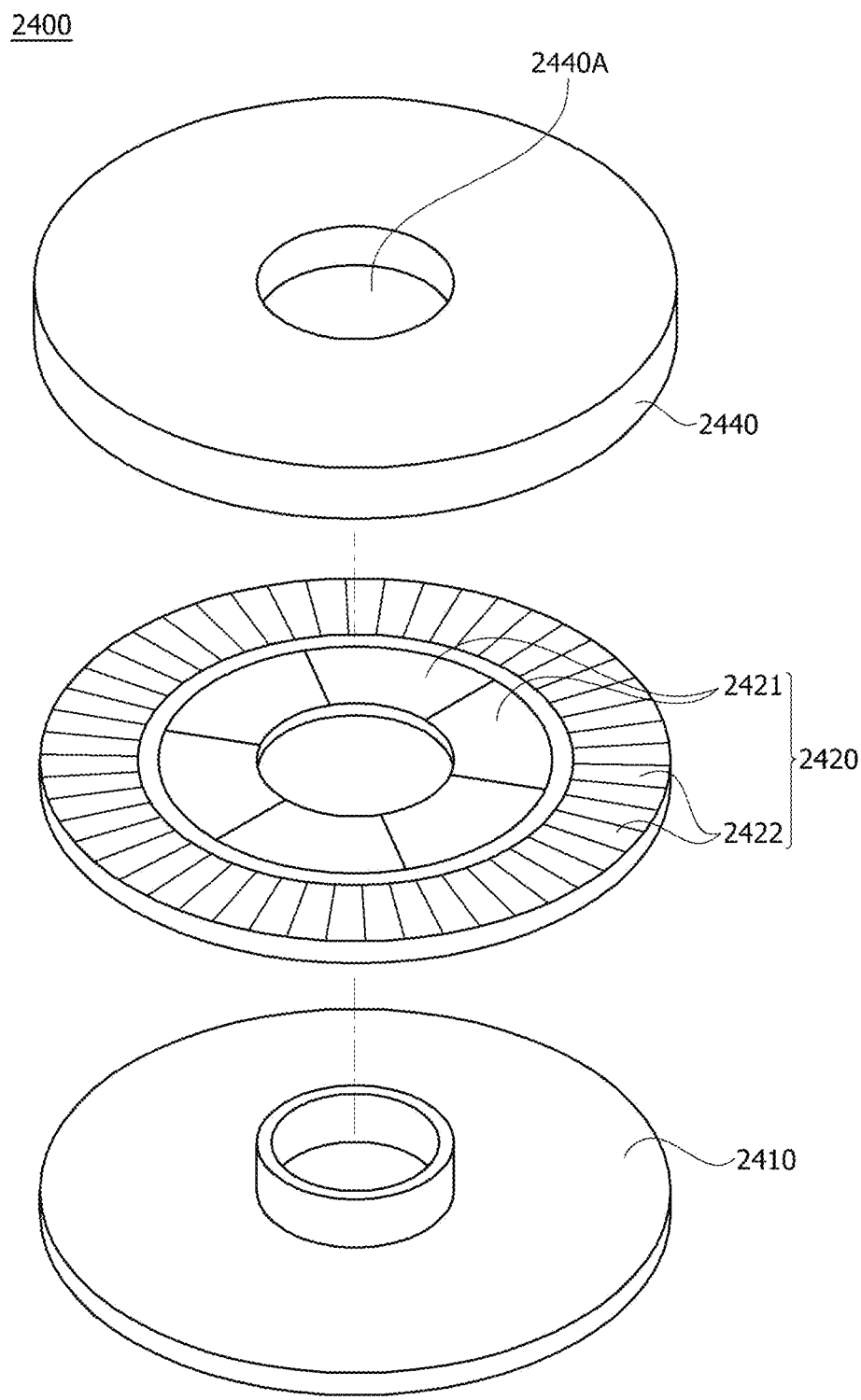
FIG. 10 is a view illustrating a sensing magnet, a sensing plate, and a can member of the motor according to the second embodiment.

FIG. 10 is a view illustrating a sensing magnet, a sensing plate, and a can member of the motor according to the second embodiment.

Referring to FIGS. 9 and 10, the sensing plate 2410 is formed in a disc shape. In addition, the shaft 2100 is coupled to a center of the sensing plate 2410. The sensing magnet 2420 is disposed on an upper surface of the sensing plate 2410. In addition, the sensing magnet 2420 may include main magnets 2421 and sub-magnets 2422. Relatively, the main magnets 2421 are disposed at an inner side. In addition, the sub-magnets 2422 may be disposed at an outer side, that is, an edge of the sensing plate 2410.

The main magnets 2421 correspond to the magnets 2220 of the rotor 2200. In other words, the number of poles of the magnets 2220 of the rotor 2200 is equal to that of the main magnets 2421. For example, in a case in which the magnets 2220 of the rotor 2200 have six poles, the main magnets 2421 also have six poles. In addition, since pole separation regions of the magnets 2220 of the rotor 2200 are aligned with those of the main magnets 2421, positions of the main magnets 2421 may denote those of the magnets 2220 of the rotor 2200. The main magnets 2421 are used to determine an initial position of the rotor 2200.

The sub-magnets 2422 are used to determine a precise position of the rotor 2200. For example, the sub-magnets 2422 may have 72 poles.

Figure 11:
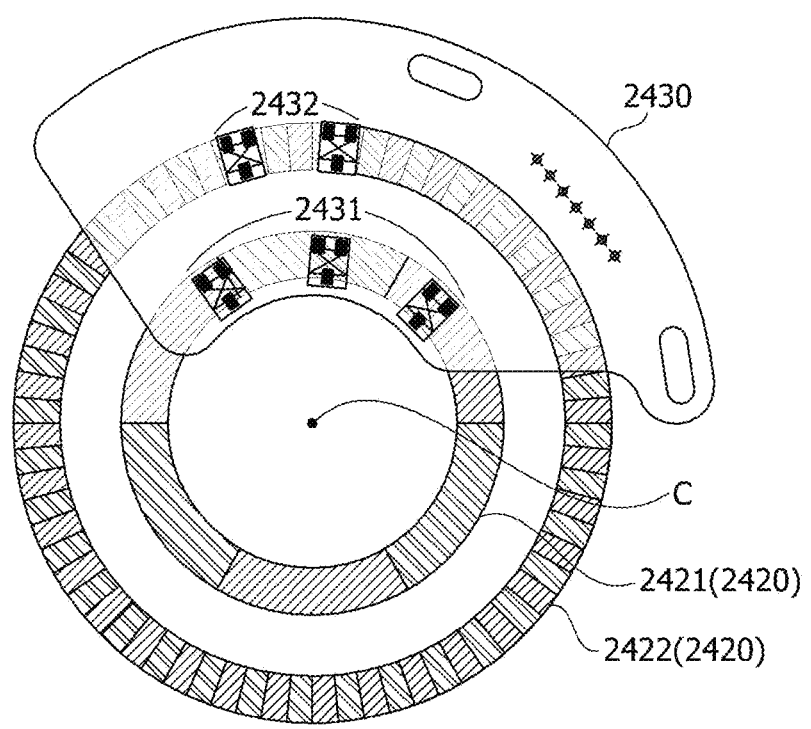
FIG. 11 is a view illustrating a substrate and a sensor of the motor according to the second embodiment.

FIG. 11 is a view illustrating a substrate and a sensor of the motor according to the second embodiment.

Referring to FIGS. 10 and 11, the substrate 2430 may be disposed on the sensing magnet 2420. The substrate 2430 may include a first sensor 2431 and a second sensor 2432. The first sensor 2431 detects a change in magnetic flux due to the main magnets 2421. In addition, the second sensor 2432 detects a change in magnetic flux due to the sub-magnets 2422. Each of the first sensor 2431 and the second sensor 2432 may be formed of a plurality of Hall sensors (Hall ICs).

Figure 12:
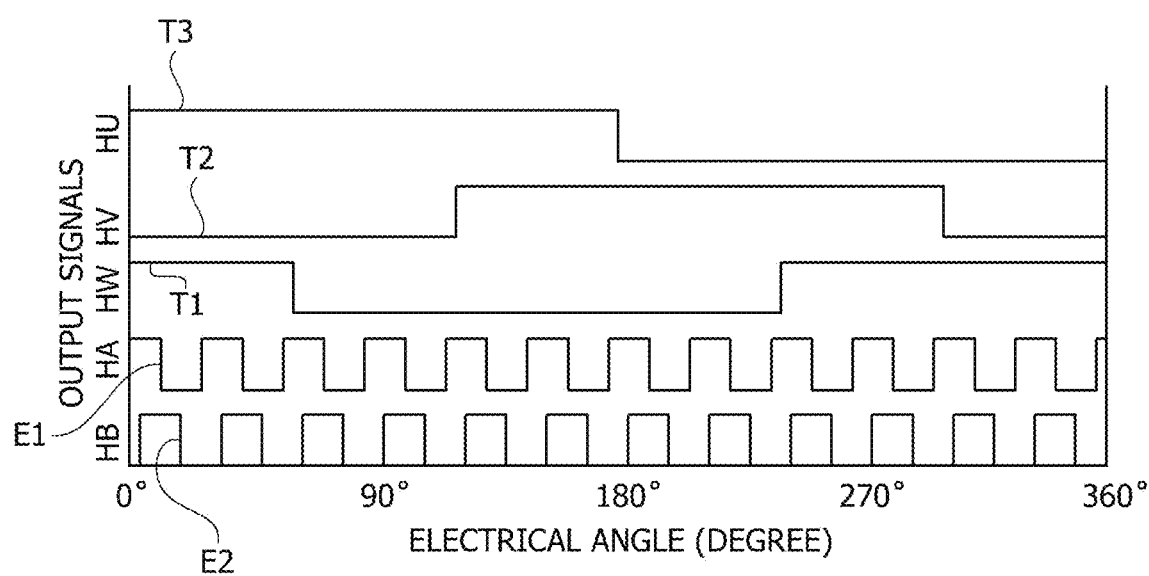
FIG. 12 is a view illustrating sensing signals of the motor according to the second embodiment.

FIG. 12 is a view illustrating sensing signals of the motor according to the second embodiment.

Referring to FIGS. 11 and 12, the first sensor 2431 may detects changes of N-poles and S-poles of the main magnets 2421 to detect three sensing signals T1, T2, and T3. In addition, the second sensor 2432 may detect a change in magnetic flux of the sub-magnets 2422 to detect two sensing signals E1 and E2.

As described above, since the main magnets 2421 are formed to match with the magnets coupled to the rotor 2200, a position of the rotor 2200 may be detected by detecting the change in magnetic flux based on the main magnets 2421. The sensing signals T1, T2, and T3 may be used when the motor is initially driven, and may respectively feedback information of U-, V-, and W-phases.

Figure 13:
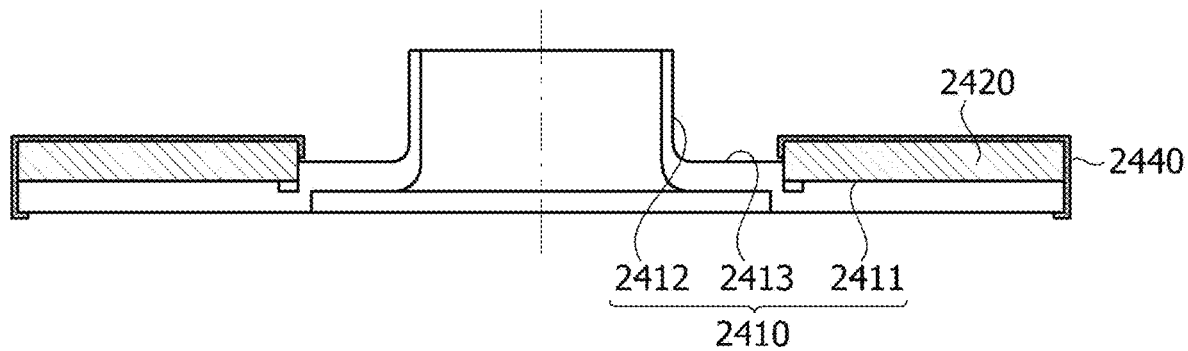
FIG. 13 is a view illustrating the can member which covers the sensing magnet of the motor according to the second embodiment.

FIG. 13 is a view illustrating the can member which covers the sensing magnet of the motor according to the second embodiment.

As illustrated in FIG. 13, the sensing plate 2410 may include a seating portion 2411 and a shaft coupling portion 2412. The seating portion 2411 is concavely disposed in an upper surface 2413 of the sensing plate 2410. The sensing magnet 2420 is seated on the seating portion 2411. An adhesive may be applied between the seating portion 2411 and the sensing magnet 2420. The shaft coupling portion 2412 has a cylindrical shape. In addition, the shaft coupling portion 2412 is disposed at a central portion of the sensing plate 2410, and a hole into which the shaft 2100 is press-fitted is disposed inside the shaft coupling portion 2412.

Referring to FIGS. 10 and 13, a can member 2440 serves to fix the sensing magnet 2420 to the sensing plate 2410. A hole 2440A through which the shaft 2100 passes may be disposed at a central portion of the can member 2440. In addition, the can member 2440 may be a roughly ring-shaped member. The sensing magnet 2420 is press-fitted into the can member 2440. In addition, the can member 2440 is coupled to the sensing plate 2410.

Figure 14:
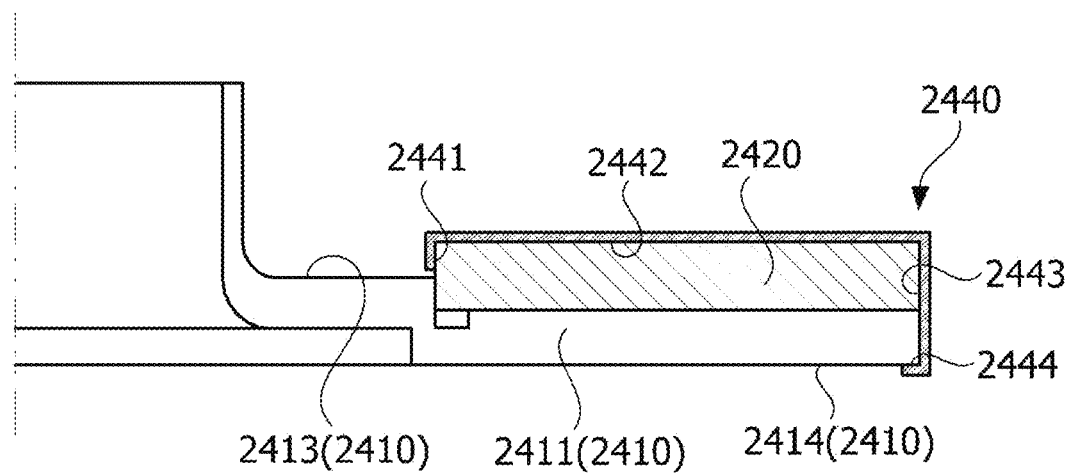
FIG. 14 is a cross-sectional view illustrating the can member of the motor according to the second embodiment.

FIG. 14 is a cross-sectional view illustrating the can member of the motor according to the second embodiment.

Referring to FIG. 14, the can member 2440 may include a first surface 2441, a second surface 2442, a third surface 2443, and a fourth surface 2444. The first surface 2441 is in contact with an inner circumferential surface of the sensing magnet 2420. In addition, the second surface 2442 is in contact with an upper surface of the sensing magnet 2420. In addition, the third surface 2443 is in contact with an outer circumferential surface of the sensing magnet 2420 and an outer circumferential surface of the sensing plate 2410. In addition, the fourth surface 2444 is in contact with a lower surface 2414 of the sensing plate 2410.

Figure 15:
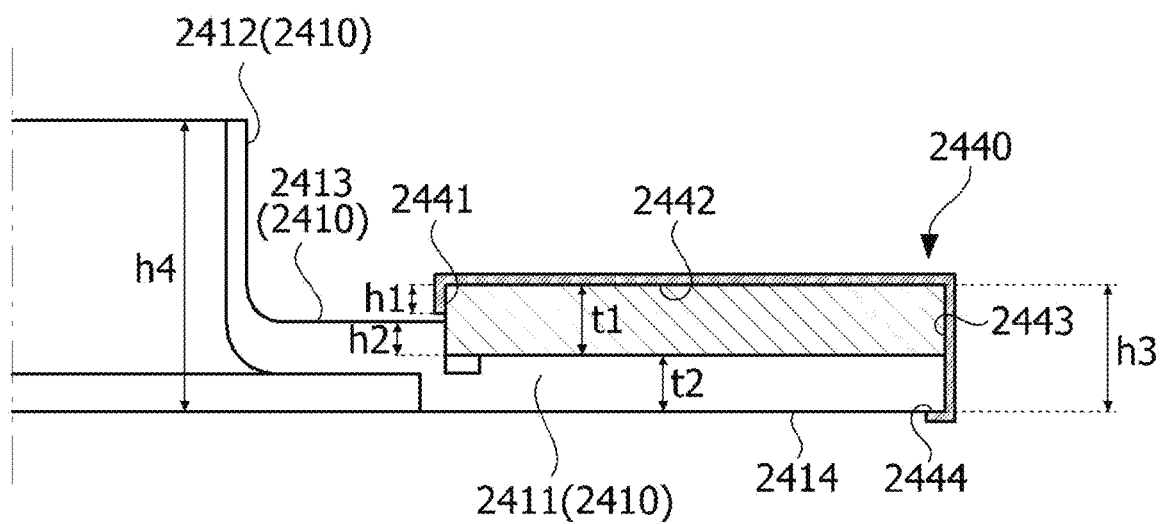
FIG. 15 is a view showing a size of the can member of the motor according to the second embodiment.

FIG. 15 is a view showing a size of the can member of the motor according to the second embodiment.

Referring to FIGS. 14 and 15, the sensing magnet 2420 is press-fitted into an accommodation space defined by the first surface 2441, the second surface 2442, and the third surface 2443.

A height h1 of the first surface 2441 based on the second surface 2442 may be less than a thickness t1 of the sensing magnet 2420. In addition, the height h1 of the first surface 2441 based on the second surface 2442 may be less than a height h2 from the seating portion 2411 of the sensing plate 2410 to the upper surface 2413 of the sensing plate 2410.

A height h3 of the third surface 2443 based on the second surface 2442 may be greater than the sum of the thickness t1 of the sensing magnet 2420 and a thickness t2 of the seating portion 2411. In addition, the height h3 of the third surface 2443 based on the second surface 2442 may also be equal to the sum of the thickness t1 of the sensing magnet 2420 and the thickness t2 of the seating portion 2411.

In addition, the height h3 of the third surface 2443 based on the second surface 2442 may be less than a distance h4 from the lower surface 2414 of the sensing plate 2410 to an upper end of the shaft coupling portion 2412.

Figure 16:
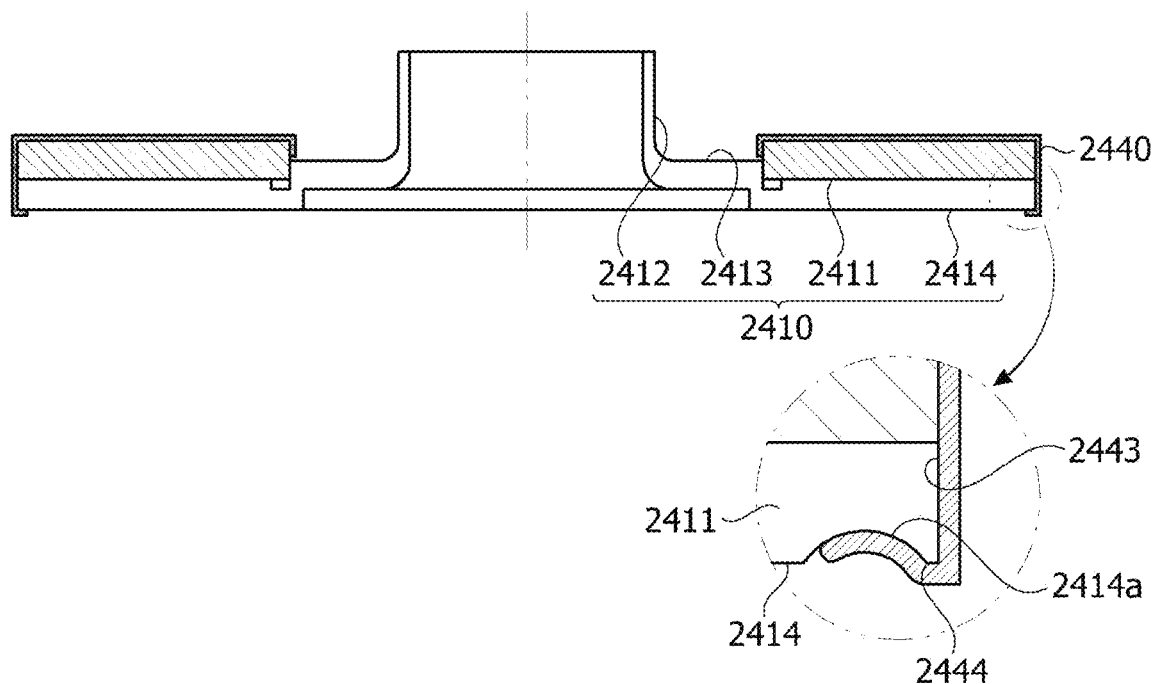
FIG. 16 is a cross-sectional view illustrating a caulk-coupled portion of the can member and the sensing plate of the motor according to the second embodiment.

FIG. 16 is a cross-sectional view illustrating a caulk-coupled portion of the can member and the sensing plate of the motor according to the second embodiment.

Referring to FIG. 16, a coupling groove 2414a concavely formed may be disposed in the lower surface 2414 of the sensing plate 2410. The fourth surface 2444 of the can member 2440 may be press-fitted into the coupling groove 2414a. The fourth surface 2444 of the can member 2440 and the lower surface 2414 of the sensing plate 2410 may be caulk-coupled to form the coupling groove 2414a.

First, the sensing magnet 2420 is initially fixedly press-fitted into the can member 2440. In addition, the sensing magnet 2420 is fixed to the seating portion 2411 of the sensing plate 2410 using an adhesive. Then, the fourth surface 2444 of the can member 2440 is caulk-coupled to the lower surface 2414 of the sensing plate 2410 so that the sensing magnet 2420 is coupled to the sensing plate 2410. The rotor position detection apparatus has an advantage in that a coupling force between the sensing magnet 2420 and the sensing plate 2410 is increased even under a condition of a high temperature, a high humidity, or a low temperature condition.

While the invention has been shown and described with reference to the exemplary embodiments thereof, it will be understood by those skilled in the art that various changes and modifications in form and details may be made therein without departing from the spirit and scope of the invention as defined by the appended claims. In addition, it should be interpreted that differences related to such changes and modifications fall within the scope defined by the appended claims.

| [Reference numerals] | |
| --- | --- |
| 1, 2: MOTOR | 10: BEARING |
| 1100, 2500: HOUSING | 1200: COVER |
| 1300, 2300: STATOR | 1400, 2200: ROTOR |
| 1500, 2100: SHAFT | 1600: BUSBAR |
| 1700: SENSOR UNIT | |
| 1800: SENSING MAGNET ASSEMBLY | |
| 1831: MAIN BODY | 1832: HOLE |
| 1832a: GROOVE | 1833: PROTRUSION |
| 1834: SLEEVE | 1835, 1835A: RIB |
| 2400: ROTOR POSITION SENSING APPARATUS | |
| 2410: SENSING PLATE | 2411: SEATING PORTION |
| 2412: SHAFT COUPLING PORTION | 2420: SENSING MAGNET |
| 2421: MAIN MAGNET | 2422: SUB-MAGNET |
| 2430: SUBSTRATE | 2431: FIRST SENSOR |
| 2432: SECOND SENSOR | 2440: CAN MEMBER |
| 2441: FIRST SURFACE | 2442: SECOND SURFACE |
| 2443: THIRD SURFACE | 2444: FOURTH SURFACE |

The invention claimed is:

1. A sensing magnet assembly comprising:
a plate;
a magnet disposed on the plate; and
an adhesive tape disposed between the plate and the magnet so as to fix the magnet to the plate,
wherein the plate includes a main body on which the adhesive tape is disposed,
wherein the main body includes a seating surface and at least one groove or at least one hole, and one surface of the adhesive tape is disposed on the seating surface, and
wherein the plate comprises a rib extending away, in a first direction perpendicular to the seating surface, from an entire outer circumferential surface of the main body.

2. The sensing magnet assembly of claim 1, wherein:
the main body includes the at least one hole;
the at least one hole is formed to pass through the main body in an axial direction; and
one side of the at least one hole is disposed at the seating surface.

3. The sensing magnet assembly of claim 1, wherein an air layer is formed between the at least one groove or the at least one hole and the adhesive tape.

4. The sensing magnet assembly of claim 1, wherein the at least one groove or the at least one hole is a groove or a hole for removing an air layer disposed between the adhesive tape and the seating surface.

5. A sensing magnet assembly comprising:
a plate;
a magnet disposed on the plate; and
an adhesive tape disposed between the plate and the magnet so as to fix the magnet to the plate,
wherein the plate includes a main body on which the adhesive tape is disposed,
wherein the main body includes a seating surface and at least one groove, and one surface of the adhesive tape is disposed on the seating surface,
wherein the at least one groove is formed concavely in a downward direction in the seating surface and formed in a radial direction from a center of the main body.

6. The sensing magnet assembly of claim 5, wherein one side of the at least one groove extends to an outer circumferential surface of the main body.

7. The sensing magnet assembly of claim 6, wherein the plate includes a rib that extends upward from the outer circumferential surface of the main body,
wherein the rib includes a plurality of protrusions disposed to be spaced apart from each other in a circumferential direction, and one side of the groove that extends to the outer circumferential surface of the main body is disposed between the protrusions.

8. A sensing magnet assembly comprising:
a plate;
a magnet disposed on the plate; and
an adhesive tape disposed between the plate and the magnet so as to fix the magnet to the plate,
wherein the plate includes a first region including a rib and a second region in which the adhesive tape is disposed,
wherein the second region of the plate includes two or more holes or grooves, and the holes or the grooves are rotationally symmetrical based on a center (C) of the plate, and
wherein the rib extends away, in a first direction perpendicular to the second region, from an entire outer circumferential surface of the plate.

9. A motor comprising:
a shaft;
a rotor disposed outside the shaft;
a stator disposed outside the rotor;
a sensing magnet assembly disposed on the stator; and
a sensor unit disposed on the sensing magnet assembly,
wherein the sensing magnet assembly includes a plate, a magnet disposed on the plate, and an adhesive tape disposed between the plate and the magnet so as to fix the magnet to the plate,
wherein the plate includes a main body on which the adhesive tape is disposed,
wherein the main body includes a seating surface and a plurality of grooves or holes, and one surface of the adhesive tape is disposed on the seating surface, and wherein the plate comprises a rib extending away, in a first direction perpendicular to the seating surface, from an entire outer circumferential surface of the main body.

10. A rotor position sensing apparatus comprising:
a sensing plate;
a sensing magnet disposed on an upper surface of the sensing plate; and
a substrate disposed on the sensing magnet,
wherein the rotor position sensing apparatus comprises a can member coupled to the sensing magnet so as to surround the sensing magnet and coupled to the sensing plate, and
wherein the can member includes:
  a first surface in contact with an inner circumferential surface of the sensing magnet;
  a second surface in contact with an upper surface of the sensing magnet;
  a third surface in contact with an outer circumferential surface of the sensing magnet and an outer circumferential surface of the sensing plate; and
  a fourth surface in contact with a lower surface of the sensing plate.

11. The rotor position sensing apparatus of claim 10, wherein the sensing plate: includes a coupling groove concavely formed in the lower surface of the sensing plate; and is disposed in the coupling groove in which a protrusion of the fourth surface is positioned.

12. The rotor position sensing apparatus of claim 10, wherein the sensing plate includes a shaft coupling portion having a cylindrical shape in which a hole is disposed.

13. The rotor position sensing apparatus of claim 12, wherein a height of the third surface based on the second surface is:
  greater than the sum of a thickness of the sensing magnet and a thickness of a seating portion of the sensing plate; and
  less than a height from the lower surface of the sensing plate to an upper end of the shaft coupling portion.

* * * * *